US006770721B1

(12) United States Patent
Kim

(10) Patent No.: US 6,770,721 B1
(45) Date of Patent: Aug. 3, 2004

(54) POLYMER GEL CONTACT MASKS AND METHODS AND MOLDS FOR MAKING SAME

(75) Inventor: Enoch Kim, Boston, MA (US)

(73) Assignee: Surface Logix, Inc., Brighton, MA (US)

(*) Notice: Subject to any disclaimer, the term of this patent is extended or adjusted under 35 U.S.C. 154(b) by 0 days.

(21) Appl. No.: 09/705,187

(22) Filed: Nov. 2, 2000

(51) Int. Cl.[7] .......................................... C08F 220/10

(52) U.S. Cl. ..................... 526/329; 526/328; 428/500; 428/523; 428/447; 428/423.1; 435/4

(58) Field of Search ................................ 526/328, 329; 428/500, 523, 447, 423.1; 435/4

(56) References Cited

U.S. PATENT DOCUMENTS

| | | | |
|---|---|---|---|
| 2,905,539 A | | 9/1959 | Bowerman |
| 3,220,960 A | | 11/1965 | Wichterle et al. |
| 3,408,429 A | | 10/1968 | Wichterle |
| 4,359,558 A | | 11/1982 | Gould et al. |
| 4,361,657 A | * | 11/1982 | Atkinson et al. |
| 4,404,249 A | | 9/1983 | Margerum et al. |
| 4,408,023 A | | 10/1983 | Gould et al. |
| 4,454,309 A | | 6/1984 | Gould et al. |
| 4,496,535 A | | 1/1985 | Gould et al. |
| 4,512,848 A | | 4/1985 | Deckman et al. |
| 4,528,260 A | | 7/1985 | Kane |
| 4,619,793 A | | 10/1986 | Lee |
| 4,702,732 A | * | 10/1987 | Powers et al. |
| 4,731,155 A | | 3/1988 | Napoli et al. |
| 4,748,124 A | | 5/1988 | Vogler |
| 4,802,951 A | | 2/1989 | Clark et al. |
| 4,897,325 A | | 1/1990 | Akkapeddi et al. |
| 4,943,618 A | | 7/1990 | Stoy et al. |
| 5,032,216 A | | 7/1991 | Felten |
| 5,129,807 A | | 7/1992 | Oriez et al. |
| 5,229,163 A | | 7/1993 | Fox |
| 5,229,172 A | | 7/1993 | Cahalan et al. |
| 5,259,926 A | | 11/1993 | Kuwabara et al. |
| 5,281,540 A | | 1/1994 | Merkh et al. |
| 5,364,662 A | | 11/1994 | Domenico et al. |
| 5,369,012 A | | 11/1994 | Koontz et al. |
| 5,427,663 A | | 6/1995 | Austin et al. |
| 5,512,131 A | | 4/1996 | Kumar et al. |
| 5,514,380 A | | 5/1996 | Song et al. |
| 5,516,527 A | | 5/1996 | Curatolo |
| 5,541,304 A | | 7/1996 | Thompson |
| 5,589,563 A | | 12/1996 | Ward et al. |
| 5,599,695 A | | 2/1997 | Pease et al. |
| 5,776,748 A | | 7/1998 | Singhvi et al. |
| 5,948,621 A | | 9/1999 | Turner et al. |
| 5,961,479 A | | 10/1999 | Reeves et al. |
| 5,965,237 A | | 10/1999 | Bruin et al. |
| 6,011,082 A | | 1/2000 | Wang et al. |
| 6,039,897 A | | 3/2000 | Lochhead et al. |
| 6,043,328 A | | 3/2000 | Domschke et al. |
| 6,060,121 A | | 5/2000 | Hidber et al. |
| 6,071,108 A | | 6/2000 | Gohr et al. |
| 6,071,111 A | | 6/2000 | Doke et al. |
| 6,086,798 A | | 7/2000 | Hirukawa |
| 6,099,122 A | | 8/2000 | Chabrecek et al. |
| 6,106,260 A | | 8/2000 | Matsomoto et al. |
| 6,113,629 A | * | 9/2000 | Ken |
| 6,133,030 A | | 10/2000 | Bhatia et al. |
| 6,180,239 B1 | | 1/2001 | Whitesides et al. |
| 6,187,214 B1 | | 2/2001 | Ganan-Calvo |
| 6,235,541 B1 | | 5/2001 | Brizzolara |
| 6,238,538 B1 | | 5/2001 | Parce et al. |
| 2001/0053527 A1 | | 12/2001 | Patil et al. |
| 2002/0086423 A1 | * | 7/2002 | Takezawa et al. |

FOREIGN PATENT DOCUMENTS

| | | |
|---|---|---|
| WO | WO 95/12480 | 11/1994 |
| WO | WO 97/07429 | 8/1996 |
| WO | WO 98/07069 | 8/1997 |
| WO | WO 98/58967 | 6/1998 |
| WO | WO 99/54786 | 4/1999 |
| WO | WO 01/70389 A2 | 3/2001 |
| WO | WO 02/04113 A2 | 7/2001 |

OTHER PUBLICATIONS

N. Balaban et al., Force and Focal Adhesion Assembly: A Close Relationship Studied Using Elastic Micropatterned Substrates, Nature Cell Biology, May 2001, 3, 466–473.

S. Britland et al., Micropatterning Proteins and Synthetic Peptides on Solid Supports: Novel Applciation for Microelectronics Fabrication Technology, Biotechnol. Prog., 1992, 8, 155–160.

C. Chen et al., Micropatterned Surfaces for Control of Cell Shape, Position, and Function, Biotechnol. Prog., 1998, 14, 356–363.

J. Cooper McDonald et al., Fabrication of a Configurable, Single–Use Microfluidic Device, Anal. Chem., 2001, 73, 5645–5650.

A. Fang et al., Soft–Lithography–Mediated Submicrometer Patterning of Self–Assembled Monolayer of Hemoglobin on ITO Surfaces, Langmuir, 2000, 16, 5221–5226.

M. Geissler et al., Microcontact–Printing Chemical Patterns with Flat Stamps, J. Am. Chem. Soc., 2000, 122, 6303–6304.

Y. Ito, Surface Micropatterning to Regulate Cell Functions, Biomaterials, 1999, 20, 2333–2342.

Y. Ito, Micropattern Immobilization of Polysaccharide, Journal of Inorganic Biochemistry, 2000, 79, 77–81.

R. Jackman et al., Using Elastomeric Membranes as Dry Resists and for Dry Lift–Off, Langmuir, 1999, 15, 2973–2984.

(List continued on next page.)

Primary Examiner—Kuo-Liang Peng
(74) Attorney, Agent, or Firm—Kenyon & Kenyon

(57) ABSTRACT

The present invention relates to elastomeric contact masks, and methods of making these contact masks by complementary molding using complementary molds. The contact masks are made of polymer gels, including hydrogel materials. The complementary molds of the present invention include at least one elastomeric half mold. Also disclosed are methods of continuous complementary molding.

28 Claims, 3 Drawing Sheets-

OTHER PUBLICATIONS

A. Janshoff et al., Micropatterned Solid–Supported Membranes Formed by Micromolding in Capillaries, Eur Biophys J, 2000, 29, 549–554.

R. Kane et al., Patterning Proteins and Cells Using Soft Lithography, Biomaterials, 1999, 20, 2363–2376.

G. Lopez et al., Convenient Methods for Patterning the Adhesion of Mammalian Cells to Surfaces Using Self–Assembled Monolayers of Alkanethiolates on Gold, J. Am. Chem. Soc., 1993, 115, 5877–5878.

J. Love et al., Fabrication of Three–Dimensional Microfluidic Systems by Soft Lithography, Mrs Bulletin, 2001, 523–528.

G. MacBeath, Proteomics Comes to the Surface, Nature Biotechnology, 2001, 19, 828–829.

M. Mrksich et al., Using Microcontact Printing to Pattern the Attachment of Mammalian Cells to Self–Assembled Monolayers of Alkanethiolates on Transparent Films of Gold and Silver.

M. Mrksich et al., Patterning Self–Assembled Monolayers Using Microcontact Printing: A New Technology for Biosensors, Reviews, 228–235.

E. Ostuni et al., Patterning Mammalian Cells Using Elastomeric Membranes, Langmuir, 2000.

S. Quake et al., From Micro–to Nanofabrication with Soft Materials, Science, 2000, 290, 1536–1540.

X. Ren et al., Electroosmotic Properties of Microfluidic Channels Composed of Poly(Dimethylsiloxane), Journal of Chromatography, 2001, 762, 117–125.

J. Rogers et al., Using an Elastomeric Phase Mask for Sub–100 nm Photolithography in the Optical Near Field, Appl. Phys. Lett., 1997, 20, 2658–2660.

A. Schwarz et al., Micropatterning of Biomolecules on Polymer Substrates, Langmuir, 1998, 14, 5526–5531.

S. Takayama et al., Patterning Cells and Their Environments Using Multiple Laminar Fluid Flows in Capillary Networks, Proc. Natl. Acad. Sci., 1999, 96, 5545–5548.

S. Takayama et al., Patterning the Topographical Environment for Mammalian Cell Culture Using Laminar Flows in Capillaries, Poster, 1990, 322–325.

M. Yousaf et al., Using Electroactive Substrates to Pattern the Attachment of Two Different Cell Populations, PNAS, 2001, 98, 5992–5996.

Advanced Materials 1997, 9, No. 8, pp. 593, 596.

Kim Enoch et al., "Solvent–Assisted Microcontact Molding: A Convenient Method for Fabricating Three–Dimensional Structures on Surfaces of Polymers", Advanced Materials, 1997, vol. 9, No. 8, pp. 651–654.

Laurent Libioulle et al., "Contact–Inking Stamps for Microcontact Printing of Alkanethiols on Gold", Langmuir, 1999, vol. 15, No. 2, pp. 300–304.

Ryuichiro Yoda, "Elastomers for biomedical applications", J. Biomater. Sci. Polymer Edn. 1998, vol. 9, No. 6, pp. 561–626.

André Bernard et al., "Printing Patterns of Proteins", Langmuir, 1998, vol. 14, No. 9, pp. 2226–2228.

Hannes Kind et al., "Patterned Electroless Deposition of Copper by Microcontact Printing Palladium (II) Complexes on Titanium–Covered Surfaces", Langmuir, 2000, vol. 16, No. 16, pp. 6387–6373.

A.S.G. Curtis et al., "Adhesion of Cells to Polystyrene Surfaces", J. Cell Biology, 1983, vol. 97, pp. 1500–1506.

A.S.G. Curtis et al., "Substrate Hydroxylation and Cell Adhesion", J. Cell Science, 1986, vol. 86, pp. 9–24.

Albert Folch and Mehmet Toner, "Cellular Micropatterns on Biocompatible Materials", Biotechnol. Prog., 1998, vol. 14, pp. 388–392.

Younan Xia and George M. Whitesides, "Soft Lithography", Angew. Chem. Ins. Ed., 1998, vol. 37, pp. 550–575.

Yoshihito Osada and Jian–Ping Gong, "Soft and Wet Materials: Polymer Gels", Advanced Materials, 1998, vol. 10, No. 11, pp. 827–837.

David C. Duffy et al., Patterning Electroluminescent Materials with Feature Sizes as Small as 5 μm Using Elastomeric Membranes as Masks for Dry Life–Off, Advanced Materials, 1999, vol. 11, No. 7, pp. 546–552.

* cited by examiner

POLYMER GEL CONTACT MASKS AND METHODS AND MOLDS FOR MAKING SAME

FIELD OF THE INVENTION

The present invention relates to polymer gel patterning elements such as contact masks and diffusion masks and molding methods for making these patterning elements including complementary molding techniques.

BACKGROUND OF THE INVENTION

In the fields of drug development, cellular biology, tissue engineering and physiology, there is now a need for devices with features on the size scale of individual cells. In particular, devices for controlling the spatial arrangement of assay materials in a format of arrays are important in these fields. In drug development, arrays are used to increase throughput and decrease the labor involved in screening compounds. High throughput screening requires parallel handling of chemical compounds, biochemical reagents, biological targets and other reagents, collectively referred to herein as biological materials.

Advances in high throughput screening depend upon automation, miniaturization and improved detection technology. Examples of biological assays that have been automated include ligand receptor binding assays, scintillation proximity assays, enzyme assays, enzyme-linked immunosorbent assays (ELISA), reporter gene assays, cell proliferation and toxicity assays, endotoxin assays and agglutination assays. The present invention relates most closely to miniaturization.

Younan Xia and George M. Whitesides, "Soft Lithography" Angew. Chem. Ins. Ed. 37, 550–575 (1998) describes methods for patterning a variety of materials on surfaces using pattern-transfer elements made of polydimethylsiloxane ("PDMS"). In one extension of soft lithography, a PDMS contact mask is used to shield a substrate in all areas except where there are holes through the contact mask. Material is then passed through the holes and onto the exposed portions of the substrate.

In at least one significant way, PDMS pattern transfer elements are better adapted to patterning of inorganic materials, such as electroluminescent compounds for optical displays, such as is described in Duffy, et. al Adv. *Material* 1999, 11, 546–552, than they are for patterning biological materials; because PDMS is cytophilic. Consequently, when patterning cells using a PDMS patterning element, a large proportion of the cells intended for deposition onto the substrate are diverted because they adhere to the patterning element.

With the development of high throughput screening assay chips for use in drug discovery and medical research there is now a need for patterning elements that are non-cytophilic to complement, and in some instances to replace, PDMS elements used in these applications. The present invention meets this need by providing patterning elements made of materials with low cytophilicity and good biocompatibility.

In addition, polymers that form gels with water have properties similar to networks of proteins and polysaccharides that make up much of the extracellular material of the human body. This fact has spurred an interest in using hydrogels in medical implants. These materials may be well suited for creating an in vitro environment for the study of cells and other biological materials.

The handling of minute quantities of chemicals and biological materials as required for high throughput screening of drug candidates is a challenge currently facing the pharmaceutical industry. For instance, the lack of suitable liquid handling devices has been is cited as a stumbling block to further screen miniaturization. Stylli H; "An Integrated Approach to High Throughput Screening" in Handbook for the 1994 *International Forum on Advances in Screening Technologies and Data Management* at p. 5. Methods have been developed to position such minute quantities in a small area using robotic equipment and ink jet delivery devices. Commonly-assigned co-pending patent application Ser. No. 09/709,776 discloses alternative methods of positioning minute quantities of material in a small area on a biological array that are compatible with and complementary to robotic methods. One such method involves placing a contact mask over a substrate to conceal a portion of the substrate and leave a plurality of discontinuous portions of the substrate exposed. Such a mask has a plurality of holes through it. Each of the holes, together with the portion of the substrate surface which it overlies, forms a cavity. Biological and chemical materials can be deposited into each of the cavities individually using robotic equipment, or collectively by immersion in a solution, spraying, brushing or dropwise deposition using far less sophisticated and expensive equipment than is conventionally used to address individual elements of an array. PDMS has desirable adhesion, elasticity and strength properties and can be cast from a non-viscous precursor so that minute features like 50 $\mu$m holes are transferred from a mold master to the PDMS. PDMS, however, is cytophilic, which is problematic for patterning cells, proteins and other biological materials in an array because these materials tend to adsorb onto the PDMS. In many applications for which bioarrays are suited, it is necessary to deposit material over the entire array or into a large group of adjacent cavities. Depositing material over a large contiguous portion of an array has potential cost savings in fabricating and using the array because these steps can be conducted without expensive and time consuming robotic manipulations. However, when large areas of the array are addressed collectively, it is detrimental to the process if the material adheres to the top surface of the contact mask instead of depositing into a cavity. In addition, material adsorbed by the PDMS in one patterning step may interfere or react with material being patterned in a subsequent step. The present invention provides a solution to this problem by providing a non-cytophilic patterning element, such as a contact mask, that has the desired properties of adhesion and elasticity (akin to those of PDMS) and acceptable tensile strength for use in patterning of biological and chemical materials on microarrays.

SUMMARY OF THE INVENTION

In accordance with one embodiment of the present invention, a polymer gel patterning element for patterning biological materials is provided. In another embodiment, the present invention provides a polymer gel contact mask. Yet another embodiment of the present invention provides a contact mask comprising a polymer gel having at least one hole therethrough. Another embodiment of the present invention comprises a polymer gel contact mask formed by complementary molding.

The present invention also provides a mold for producing a hydrogel contact mask from a precursor composition, the mold comprising first and second half molds wherein the first half mold is made from an elastomer and deforms to accommodate dimensional changes in the precursor composition as it cures into a hydrogel. In another embodiment, the present invention includes a mold comprising a half mold produced by thermal imprinting with an elastomeric master. The present invention further provides a complementary mold comprising first and second half molds each having molding surfaces, wherein the molding surfaces define a void when the first and second half molds are closed and wherein at least one of the first or second half molds is an elastomer. Yet another embodiment of the present invention includes a complementary mold comprising a PDMS half mold having a first molding surface, a release film adjacent to the first molding surface, and a rigid half mold having a second molding surface, wherein the first and second molding surfaces define a void.

The present invention further provides a method of complementary molding comprising the steps of providing a complementary mold including first and second half molds each having molding surfaces, wherein the molding surfaces define a void when the first and second half molds are closed and wherein at least one of the first or second half molds is an elastomer. Further wherein a polymerizable precursor is introduced, the half molds are closed, and the molding precursor is polymerized. Alternatively, the polymerizable precursor can be introduced into the void after the mold surfaces form the seal.

In another embodiment of the present invention, a method of complementary molding comprises the steps of providing a complementary mold including first and second half molds each having a molding surface, the molding surfaces defining a void there between, wherein the half molds close to form a void, and wherein at least one of the first or second components is an elastomer. The method further includes closing the half molds to form a void, introducing a polymerizable precursor into the void after the mold surfaces form the void, and polymerizing the molding precursor.

In yet another embodiment of the present invention, a method of continuous complementary molding comprises the steps of providing a first half mold including a plurality of first molding surfaces adapted and arranged for moving the molding surfaces from an unprocessed position to a processed position, providing a second half mold having a second molding surface, wherein the first and second molding surfaces form a void there between when closed, applying polymerizable polymer precursor to one of the molding surfaces in the unprocessed position, closing the half molds, polymerizing the polymer precursor, and moving the molded polymer to the processed position.

Another embodiment of the present invention includes a method of thermal imprinting comprising the steps of providing an elastomeric master having a first imprinting surface and a elastomeric substrate having a second imprinting surface, introducing a film having a lower glass transition temperature than the elastomeric master and the elastomeric substrate, between the elastomeric master and the elastomeric substrate, heating the film to a temperature above the glass transition temperature of the film, and cooling the film. Yet another embodiment of the present invention includes a method of forming a rigid complementary half mold comprising the steps of providing a first PDMS master having a first imprinting surface with surface features, providing a second PDMS substrate having a second imprinting surface, providing a polyethylene film between the first and second imprinting surfaces, applying pressure to the layered structure, heating the layered structure above the glass transition temperature of the polyethylene, and cooling the layered structure.

BRIEF DESCRIPTION OF THE DRAWINGS

The various features of the invention will be appreciated by simultaneous reference to the description which follows and the accompanying drawings.

DETAILED DESCRIPTION OF THE PREFERRED EMBODIMENTS

Figure 1:
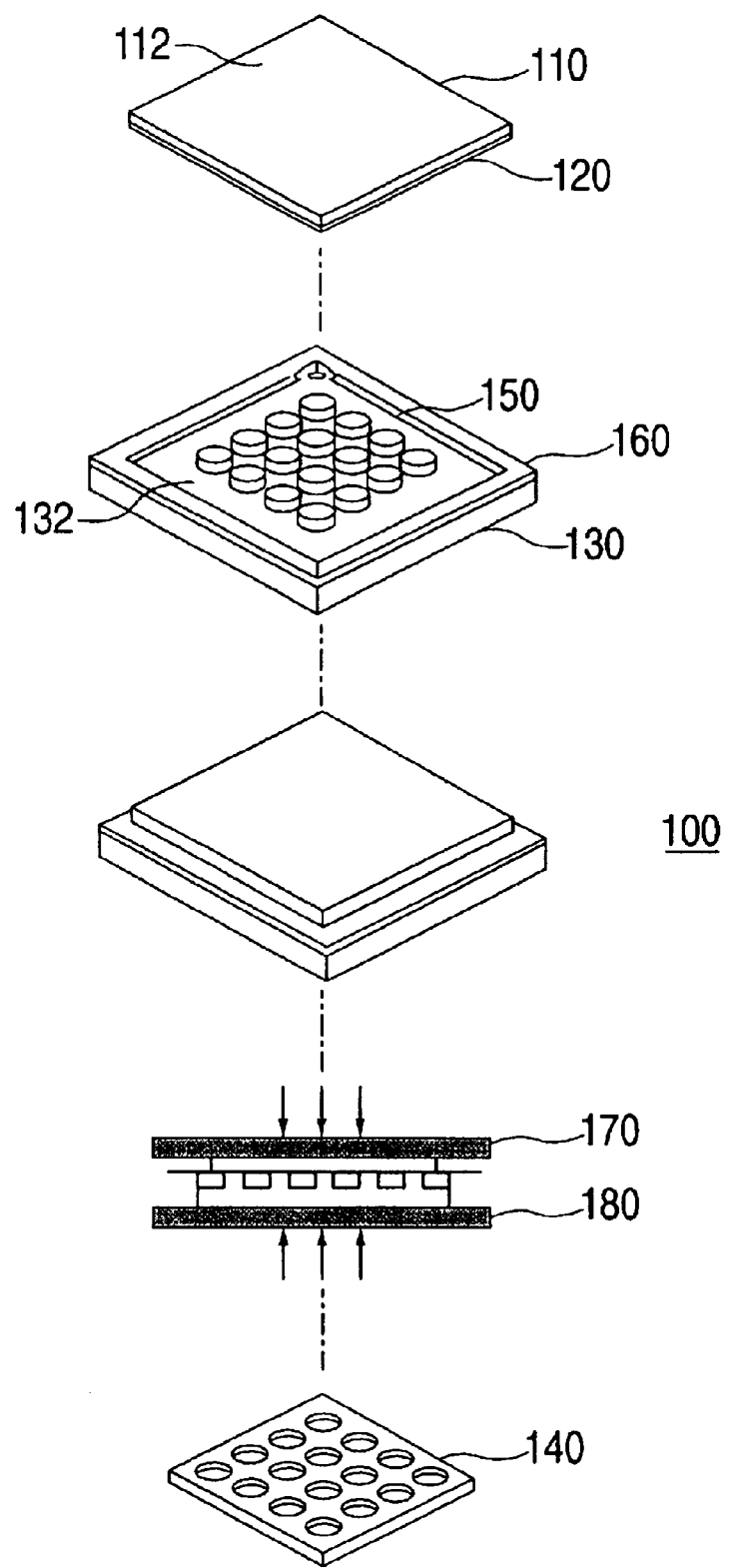
FIG. 1 illustrates a complementary molding process for forming an elastomeric contact mask in accordance with the principles of the present invention.

The present invention provides patterning elements that are uniquely well suited for patterning biological materials in micro-arrays on a surface.

The present invention further provides methods of forming these patterning elements by a technique dubbed "complementary molding." Complementary molding is a new useful application of soft lithography techniques developed to date.

The patterning elements of the present invention are made from polymers that form gels when contacted with a liquid. A characteristic feature of gel-forming polymers is that they absorb the liquid but do not dissolve in the liquid. Absorption of the liquid often causes a change in the polymer's elasticity, tensile strength and dimensions.

It is generally agreed by those trained in polymer gel technology that gel-forming polymers do not dissolve in liquids with which they form gels because the polymer chains are bound together, such as by covalent bonds as in crosslinking or by extensive physical interactions as in interpenetrating polymer networks. Gel-forming polymers typically are crosslinked polymer networks. Crosslinking between the chains prevents separation of the polymer chains from each other which would lead to dissolution.

Polyelectrolyte gels are also suitable gel-forming polymers of the present invention. Polymers within the class of polyelectrolyte gels possess charges within their network or the ability to stabilize a large number of ions in a polymer network. These polyelectrolyte gels can exhibit electrically induced contraction over time due to electrochemical phenomenon as well as produce electrical potentials due to mechanical deformation. Advantages arising from the use of gel-forming polymers, generally, in the molding process of the invention are discussed below.

Preferred gel-forming polymers of the present invention are hydrogels. A hydrogel is a polymer that absorbs water. Such absorption can be reversible or irreversible. In their hydrated condition, hydrogels are elastically deformable but virtually immune to plastic deformation. In their dry state, hydrogels are often structurally rigid and can be manipulated or formed via known processes, such as machining, etching, and injection molding. Like other gel-forming polymers, hydrogels are typically crosslinked polymers. As used herein, hydrogels can include naturally occurring hydrogels, modified naturally occurring polymers, synthetic hydrogels, and combinations thereof. Hydrogel materials can be charged (e.g. anionic, cationic, ampholytic) or neutral and they can form amorphous and semicrystalline structures. Hydrogel materials include polymers that will absorb water in an aqueous environment and materials that with the addition of either organic or inorganic additives become hydrogel-like by absorbing water.

Exemplary naturally occurring hydrogels include amino acid-based hydrogels, glycoprotein-based hydrogels, carbohydrate-based hydrogels and gums, such as gellan and zanthanes. Exemplary amino acid-based hydrogels include polyalanine and polylysine. Exemplary glycoprotein-based hydrogels include gelatin.

Exemplary carbohydrate-based polymers are dextrins, dextran, dextran sulfate, heparin, heparin sulfate, chitin, chitosan, pullulan, gellan, starch, alginates, hyaluronic acid, agar and cellulose derivatives such as methylcellulose, hydroxymethyl cellulose, hydroxyethyl cellulose, hydroxypropyl cellulose, hydroxypropylmethyl cellulose, cellulose acetate, and sodium carboxymethyl cellulose.

Preferred hydrogels of the present invention are synthetic hydrogels because patterning elements may be readily made from synthetic hydrogels by polymerization of low viscosity mixtures in molds like those described below. The low viscosity of the starting material is advantageous because it enables the faithful reproduction of minute surface features from the molding surface onto the surface of the patterning element.

Synthetic hydrogels may be homopolymers, co- or ter-polymers hydrogels. Synthetic homopolymer hydrogels of the invention are made by polymerizing a hydrophilic monomer or oligomers with a difunctional or multifunctional cross linking agent.

Hydrophilic monomers that can be used to form the hydrogel patterning element include compounds of formula (I):

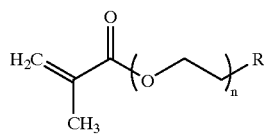

wherein n=1–12 and R=—H, —CH$_3$, —CH$_2$CH$_3$, —SO$_2$, —SO$_3^2$, —CH$_2$NH$_2$, —OH, —OCH$_3$, or —Si(OR')$_3$, and R' is a linear or branched lower alkyl.

Especially preferred methacrylate monomers include 2-hydroxyethylmethacrylate ("HEMA"), methacrylic acid ("MAA"), (1-hydroxypropyl) methacrylate, (2-hydroxypropyl) methacrylate, (2,3-dihydroxypropyl) methacrylate, and polyethylene glycol methacrylates having anywhere from two to about twelve repeat units (i.e. n≦12). Other suitable hydrophilic monomers that may be used include acrylates such as acrylic acid ("AA"), 2-hydroxyethyl acrylate, hydroxypropyl methacrylate, glycerol monoacrylate, methacryloxyethyl glycoside (all anomers); acrylamides such as diacetone acrylamide, 2-acrylamido-2-methylpropanesulfonic acid, N-vinyl acrylamide, -methacryloyltris(hydroxymethyl) methylamine; vinyl ester and amide monomers, such as N-vinyl pyrollidinone, -vinyl formamide and vinyl acetate; sulfonyl-containing monomers such as 3-sulfopropyl methacrylate and vinyl sulfonic acid; polyvinyl alcohols such as vinyl alcohol and allyl alcohol and hydrophilic ring-opened polymers such as poly(ethylene imine), and polyepoxide. These monomers may be used individually in a homopolymerization, in mixtures with each other in a co- or ter- polymerization or in mixtures with other olefinic monomers in a co- or ter- polymerization. In addition, pre-polymer compositions of oligomers produced from these monomers may be used.

Olefinic monomers may be polymerized by cationic, anionic or radical polymerization techniques depending upon the particular monomer(s). The above-described hydrophilic olefinic monomers are conventionally polymerized by radical polymerization. Radical polymerization requires initiation. Initiation may be by radiation, such as UV light, electron beam or high energy particles from radioactive decay, or by decomposition of a chemical initiator, or both in the case of a photolabile chemical initiator. Chemical initiators include azo compounds, peroxides, hydroperoxides and redox systems. Exemplary initiators include lauroyl peroxide, benzoyl peroxide, isopropyl percarbonate, azobisisobutyronitrile, di-t-butyl peroxide, isobutyl peroxy octoate, t-butyl peroctoate, n-butyl-4-4'-bis(t-butylperoxy) valerate and Perkadox®. Polymerization may be conducted neat or in the presence of solvent.

To produce a crosslinked polymer from mono-olefins, a bis-olefinic or multi-olefinic crosslinking agent is present. The cross-linking agent binds linear polymer chains together, thereby preventing dissolution of the polymer, yet allowing penetration of water in the network to modify the physical properties of the polymer. A wide variety of cross-linking agents may be used. One class of suitable cross-linking agents for use with hydrophilic methacrylate monomers may be represented by formula (II):

$$\text{(II)}$$

where X may be —(CH$_2$CH$_2$O)$_m$CH$_2$CH$_2$—where m=0–100, but more typically 1–25, or —CH$_2$C(O)NHCH$_2$CH$_2$NHC(O)CH$_2$—. The crosslinking agent is typically used in 0.5–10 mole % relative to the total monomer content, more typically about 1 to about 5%.

Other crosslinking agents that may be used include triethanolamine dimethacrylate, triethanolamine trimethacrylate, tris(methacryloyloxymethyl) propane, allyl methacrylate, tartaric acid dimethacrylate, divinyl benzene, N,N'-methylene-bisacrylamide, hexamethylenebis(methacryloyloxyethylene) carbamate, 2-hydroxytrimethylene dimethacrylate, 2,3-dihydroxytetramethylene dimethacrylate, 1,3-butanediol diacrylate, 1,4-butanediol diacrylate, diallyl diglycol carbonate, diethylene glycol vinyl ether, pentaerythritol tetraacrylate, pentaerythritol triacrylate, Synthetic co-polymer hydrogels of the invention are made by co-polymerizing two monomers, at least one of which is hydrophilic, in the presence of a difunctional or Multifinctional cross-linking agent. Ter-polymer hydrogels are made analogously from three monomers, at least one of which is hydrophilic. The above-described monomers may be co-polymerized with each other. Other exemplary hydrophilic monomers that may be co- or ter- polymerized with the above-described hydrophilic monomers include 2-(N,N-diethylamino)ethyl methacrylate and hydrolyzed acrylonitrile. Preferred hydrophilic co-monomers for co-polymerization with HEMA include MAA, AA and 2-(N, N-diethylamino)ethyl methacrylate. Co-polymers of HEMA with either MAA or AA can be produced that change dimensions when exposed to aqueous solutions of different pH. Preferred Poly(HEMA-co-MAA) and poly(HEMA-co-AA) hydrogels are preferably made from mixtures containing from about 50% to about 100% HEMA and from about 0% to about 10% MAA or AA.

In a co- or ter-polymer hydrogel, other monomers incorporated into the hydrogel also may be non-hydrophilic. Exemplary non-hydrophilic monomers that may be used include methyl acrylate, butyl acrylate, cyclohexyl acrylate and higher alkyl acrylates; methyl methacrylate, isobutyl methacrylate, n-pentyl methacrylate and higher alkyl acrylates; and a-olefins, such as octene, to name but a few.

Other polymer gel materials that can be made include polyphosphazenes, polyurethanes, polyacrylates, polymethacrylates, poly(ethylene glycol), poly(ethylene glycol) acrylates, 2-(trimethoxysilyloxy)ethyl methacrylate, trimethoxysilyloxyl alkyl methacrylate, trimethoxy silyl alkyl methacrylate, carbohydrate-based hydrogel polymers, polylactic acid, polybutadienes and combinations thereof.

Polymer gels may also be biodegradable. Many biodegradable polymers contain covalent linkages that can be hydrolyzed in biological conditions. Some examples of biodegradable polymer gels are polyhydroxyalkanoates, polylactide, poly(lacticacid-co-aminoacid), polycaprolactone, polyglycolide, poly(lactide-co-glycolide) and combinations thereof. A HEMA, or other hydrophilic polymer, may be made biodegradable by incorporating segments of biodegradable polymer into a block copolymer of HEMA and the biodegradable polymer. The hydrophilic polymer segments may be polymerized as previously described under conditions that yield low molecular weight polymer chains. The resulting polymer may be polymerized with, for example, lactide, caprolactone or glycolide monomer to form a biodegradable co-polymer. U.S. Pat. No. 5,514,380 describes one anionic block copolymerization method that may be used.

The structure of polyHEMA allows for the absorption of water closely approximating that of human tissue. This property, in addition to polyHEMA's resistance to degradation, permeability to metabolites, and relative inertness, make polyHEMA a useful material in patterning biological systems. In view of the foregoing, it will be appreciated that synthetic homo-, co- and ter- polymers that incorporate HEMA monomers are especially preferred hydrogels for making the patterning element of the present invention. Optimal weight average molecular weights of crosslinked polyHEMA hydrogels are from 20,000 to about 2,000,000, more preferably about 100,000 to about 500,000.

One especially preferred polyHEMA hydrogel is formed from a hydrogel precursor composition comprising by weight approximately 97% hydroxyethylmethacrylate ("HEMA"), approximately 2% methacrylic acid and approximately 1% ethyleneglycol dimethacrylate. Another especially preferred polyHEMA hydrogel is formed from a hydrogel precursor comprising by weight approximately 1–10% ethyleneglycol dimethacrylate oligomers where n=9–12 and approximately 90–99% HEMA.

Patterning elements that may be made from hydrogels using the molding technique and apparatus described below include stamps, such as the PDMS stamps described in U.S. Pat. Nos. 5,776,748; 5,512,131 and 5,900,160 and contact masks such as are described in commonly assigned, co-pending U.S. patent application Ser. No. 09/709,776. Hydrogels that exhibit faithful elastic memory are well suited to both applications. For instance, a hydrogel stamp is a good patterning element for patterning aqueous solutions of biological materials onto a substrate. The hydrogels are especially well suited for use as contact masks in the patterning of biological materials upon a substrate and the invention will now be further described with reference to such patterning elements, their production and use.

Contact masks are articles elongated in two dimensions relative to the third dimension. Accordingly, they have expansive bottom and top surfaces compared to the side surfaces. If flexible, their planar shape allows them to conform to, seal with, and mask many surfaces with which they may be contacted. Preferred polymeric gel contact masks for patterning biological materials and chemical materials in bioarrays have a thickness of from about 5 $\mu$m to about 3 mm, more preferably from about 5 $\mu$m to about 1 mm. Contact masks for patterning biological material also typically have one or more holes extending from the top surface to the bottom surface of the mask. Contacts masks are also useful for protecting the material on a bioarray after deposition and such masks preferably have no holes.

In another embodiment of the inventive polymeric gel patterning elements, the element is a diffusion mask for receiving materials. The diffusion mask, instead of having holes, has cavities that do not extend all the way through the mask. Thus, in such an embodiment, the patterning element is a diffusion mask having a pattern and the biological material is patterned into the cavities of the diffusion mask. The diffusion mask allows selective diffusion of material through the cavities.

Holes or cavities in the contact mask or diffusion mask, respectively, may have any desired shape. Holes and cavities preferably have a cross-sectional area of approximately 1 $\mu$m$^2$ to several mm$^2$. In masking techniques disclosed in commonly-owned co-pending U.S. application Ser. No. 09709,776 multiple masks are used to pattern multiple biological and chemical materials. In such techniques, the size and shapes of the holes may vary from one mask to another and holes of various sizes and shapes may be present on the same mask.

The present invention also provides methods of making the polymeric patterning elements using a complementary mold and complementary molding technique. The complementary mold of the present invention includes first and second half molds. One or both of the first and second half molds can be made of an elastomeric material. Alternatively, one of the first or second half molds can be made of a rigid material relative to the other half mold.

Each half mold of the complementary mold has a molding surface. The molding surfaces of the two components define a void between them when the two molding surfaces are placed together in opposition or closed. The molding surfaces can have surface features on them. These surface features have elevated portions and recessed portions. The surface features on the molding surfaces preferably have an aspect ratio of greater than approximately 0.1, more preferably in a range from approximately 0.5 to approximately 5.0 (dimension in the plane of the molding surface over the dimension orthogonal to the plane of the molding surface).

Closing the first and second half molds defines a void between the mold surfaces. The void is formed in the space between the surface features on the first and second half molds. Having at least one elastomeric half mold aids in sealing the half molds. There can be one or more spaces forming the void depending on the surface features in the molding surfaces.

A contact mask may be molded by introducing a molding precursor into the void formed by the first and second half molds and curing it. Molding precursor, as used herein, includes, but is not limited to, prepolymers, polymer precursors, polymer gel precursors, hydrogel precursors, monomers, oligomers, polymers, and crosslinkers. The precursor may be introduced into the void between the molding surfaces before the first and second half molds are placed together in opposition or closed, or injected into the void after closing the first and second half molds. Alternatively, a polymer precursor may be introduced to one or both of the mold surfaces before closing the mold. The molding precursor can be a combination of monomers, oligomers, polymers, and crosslinkers, which are then polymerized to form the polymer gel contact mask. Alternatively, a solution of polymer can be used. If a solution of polymer is used, the solution may be heated to evaporate the solvent leaving the solidified polymer.

The meaning of "curing" depends upon the precursor composition. For instance, if the polymer precursor is a dispersion of naturally occurring or synthetic polymer, curing may be evaporation of the solvent so as to leave behind a solid or semisolid polymeric gel mass that has conformed to the molding surfaces. In evaporative curing, the solution is typically heated to accelerate evaporation of the solvent, but that is not strictly necessary. Naturally occurring hydrogels and modified naturally occurring polymers may be cured into patterning elements by dissolving in a solvent, introducing the solution into the mold cavity and evaporating the solvent.

Curing of a polymer precursor containing olefinic monomers, oligomers, crosslinking agents etc. involves polymerization as previously described. Curing of such compositions may involve heating, but it also may be performed by irradiating the precursor composition. Those skilled in the art will appreciate that the preferred rigid and elastomeric materials for producing the mold halves are substantially transparent to visible and near UV light, enabling photo initiation of radical polymerization.

FIG. 1 illustrates an embodiment of the complementary molding method of the present invention using an embodiment of a complementary mold of the present invention to form a polymer gel contact mask according to the present invention.

As schematically depicted in FIG. 1, complementary mold 100 includes a first half mold 110, having a square shape, a bearing surface 112 and a molding surface (not shown). In this embodiment, the first half mold 110 does not have any surface features on its molding surface. However, first half mold 110 may have surface features. In addition, first half mold 110 can have alignment marks (not shown) on its molding surface in order to properly align it with the second half mold 130 of the complementary mold 100. Furthermore, the first half mold 110 can have a channel (not shown) for discharge of excess molding precursor present during molding. The first half mold is preferably elastomeric.

The complementary mold 100 also includes a second half mold 130, which has a bearing surface (not shown) and a molding surface 132. Second half mold 130 is preferably rigid. Second half mold 130 may optionally be formed from an elastomer such as PDMS, other silicones, polyurethanes, polyphosphazenes, natural rubber, and synthetic rubbers such as, latex, chlorosulorated polyethylene rubber, neoprene, polychlorprene rubber, styrene rubber, nitrile rubber, and ethylene propylene rubber. Preferably, the second half mold is polyethylene, polypropylene, or Teflon®. The second half mold 130 can be formed by conventional injection molding or micromachining techniques. A more preferred method of forming the second half mold 130 is thermal imprinting.

In thermal imprinting as that term is used herein, an impression is made in a workpiece by thermally softening the workpiece and pressing a master having on its surface a topological reversal of the desired impression against the workpiece. An elastomeric master, and in particular a PDMS master, can be used to imprint a concave molding surface into a variety of poly(olefin) and acrylic thermoplastics, including polyethylene, polypropylene, polybutadiene, polyisoprene and poly(methyl methacrylate). A physical requirement for such imprinting to work successfully is that the thermoplastic have a lower glass transition temperature, $T_g$, than the master. Another important property is that the molten thermoplastic have a sufficiently low viscosity that it conforms to the elastomeric master without significantly distorting the master. The necessary viscosity can generally be achieved by adjusting the imprinting temperature, which in no event should be allowed to exceed the $T_g$ of the master. This criteria is particularly important if the molding surface has surface features.

In thermal imprinting, an elastomeric master pattern can be used to transfer surface features to a polymeric article that has a lower glass transition temperature, $T_g$, than that of the elastomeric master. Thermal imprinting has several advantages: it is inexpensive, many articles may be patterned from a single master, it is a relatively simple process, and releasing the finished substrate is relatively easy.

Figure 3:
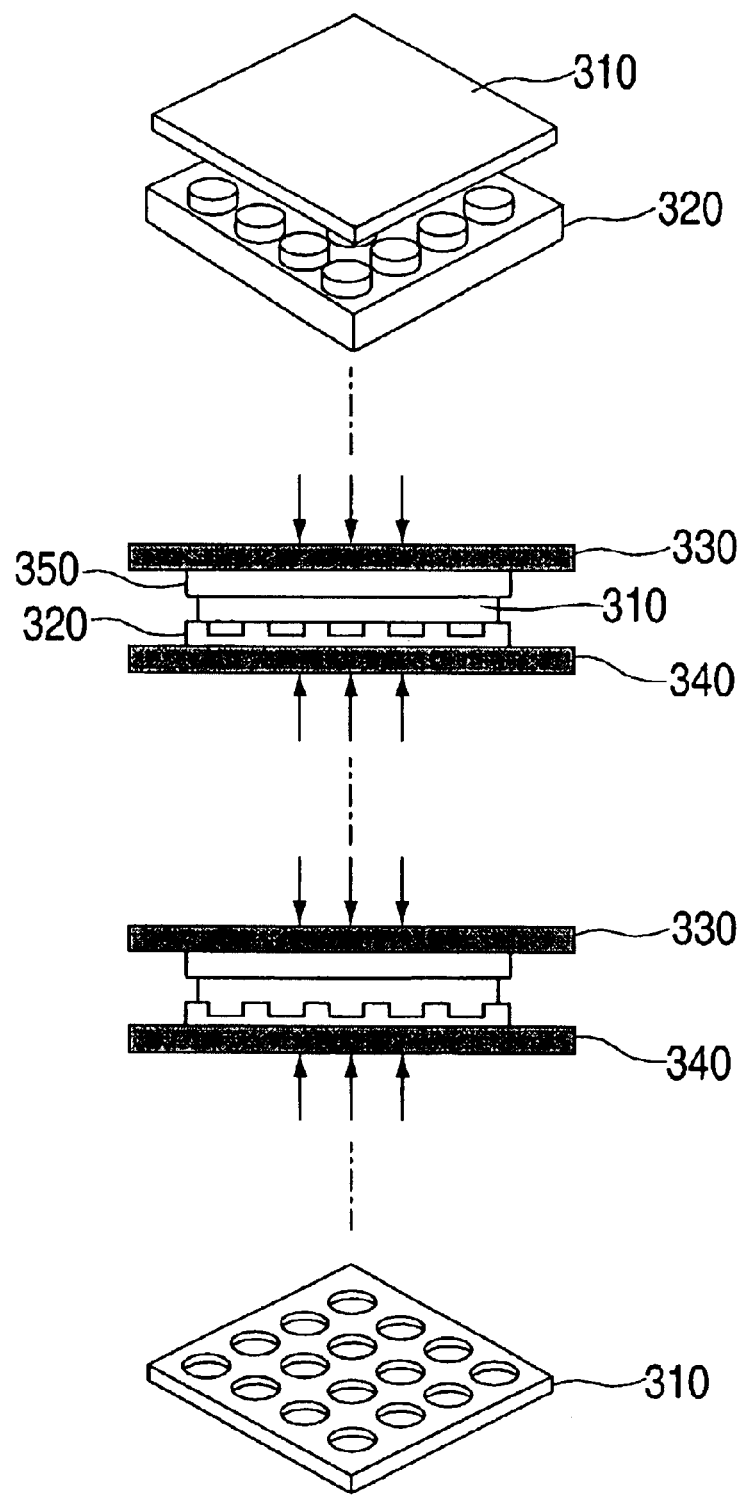
FIG. 3 illustrates a thermal imprinting process for forming a rigid component for use in one embodiment of the complementary molding process of the present invention.

FIG. 3 shows an example of a method of thermal imprinting according to the present invention. The method depicted in FIG. 3 can be used to make the components of the mold of FIG. 1. In FIG. 3, a patterned PDMS master is used to pattern a polyethylene film. Other elastomeric substrates can be used in place of PDMS in performing thermal imprinting, such as those discussed in U.S. Pat. No. 5,512,131, which is hereby incorporated herein by reference in its entirety. The embodiment shown in FIG. 3 is not limited to molding polyethylene. Both high ($T_g$~75° C.) and low ($T_g$~50° C.) density polyethylene, polymethacrylate ($T_g$~105° C.), polypropylene($T_g$~100° C.), and any material having a $T_g$ less than the master pattern material could be imprinted using this method as well. Surface features may be imprinted into a molding surface either simultaneously with the imprinting step that forms a mold surface, or in a separate step by applying a second master to the pre-formed molding surface. The surface features on the molding surfaces preferably have an aspect ratio of greater than approximately 0.1, more preferably in a range from approximately 0.5 to approximately 5.0, to ease release of the cured polymer gel.

Curing of the polymeric gel in the mold cavity forms surface features in the pattern element that are topologically reversed from the features on the mold surface.

In one illustrative method of patterning a mold component, the first step of the thermal imprinting process is to place a polyethylene film 310 between a patterned PDMS master 320 and optionally a second PDMS substrate 350. The polyethylene film 310, the PDMS master 320, and optionally the second PDMS substrate 350 are then placed between two rigid plates 330 and 340. Rigid plates 330 and 340 are placed outside the patterned PDMS master 320 and the second PDMS substrate 350. Pressure is then applied to plates 330 and 340 while the temperature of the structure is increased to-above the glass transition temperature of the polyethylene 310. As the temperature reaches the glass transition temperature of the polyethylene 310, the polyethylene 310 flows into recesses in the PDMS master 320, forming structures that are topologically reversed replicas of the pattern in the master. Once the polyethylene 310 flows into the PDMS master 320, the structure is cooled to below the glass transition temperature of the polyethylene 310 and the polyethylene 310 hardens. The PDMS master 320 and the second PDMS substrate 350 are then separated from the molded polyethylene 310. The PDMS master 320, and the PDMS master 320 can then be used to thermally imprint another polyethylene film.

In another embodiment of the thermal imprinting process, two patterned PDMS masters can be used to thermally imprint a pattern onto both sides of a polyethylene substrate. The polyethylene substrate that is to be patterned is placed between two PDMS masters such that the patterned surfaces of the PDMS masters contact the polyethylene substrate in a manner like that shown in FIG. 3. Two rigid plates are placed on the outside surface of the PDMS masters and used to apply pressure while the temperature of the structure is raised above the $T_g$ of the polyethylene. As the temperature is increased, the polyethylene flows into the relief pattern in both of the PDMS masters, thus forming negative patterns on both surfaces of the polyethylene. Once the patterns are formed, the temperature is lowered to below the $T_g$ of polyethylene. The PDMS masters are separated from the polyethylene and a polyethylene substrate, patterned on two sides, is thus formed. Although polyethylene is an exemplary substrate, it would be apparent to those of skill in the art that other polymers may be patterned using this method.

Referring back to FIG. 1, like the first half mold 110, the second half mold 130 can have surface features of any shape. The second half mold 130 may also have a channel 150 for run-off of excess molding precursor during molding. The second half mold 130 also may have alignment marks to allow proper alignment with the first half mold 110 of the complementary mold 100. The alignment marks are especially useful when both the first half mold 110 and the second half mold 130 have surface features.

A sealing structure 160 can also be incorporated into either the first or second half mold 110 or 130 respectively. The sealing structure 160 ensures that the molding precursor remains within the boundaries of the complementary mold 100. The sealing structure 160 may be an "O-ring," lip, gasket, or similar structure that is located along or near the edge of either the first half mold 110 or the second half mold 130.

Optionally, a release film 120 may be inserted between the half molds during molding to facilitate release of the polymeric gel patterning element after it has cured. The release layer isolates the precursor from one of the molding surfaces during molding. Although the release layer is typically thin, about 10 nm to several hundred microns, the release layer is preferably not used against a molding surface that has surface features that are to be transferred to the patterning element. The release layer may be made of a material that is nonadhesive toward the polymeric gel to ease release of the pattern element from the molding surface with which the release layer is in contact. For example, in FIG. 1, the release layer 120 can be a thin film of polytetrafluoroethylene or another polymer that has a working temperature above the curing temperature of the polymer precursor and has low interfacial free energy. Such materials include polytetrafluoroethylene, perfluoro silicone, perfluoro polyethylene oxide, polyvinylidene and metal foil (passivated to eliminate adhesion).

Alternatively, the release layer may be a "carrier layer" that is adhesive toward the polymeric gel causing the patterning element to adhere to the carrier layer when the half molds are separated. Such materials include silicone films, metal foils, oxidized polymer films, Mylar® (coated with $SiO_2$ for example). A carrier layer is advantageously used to separate the polymeric gel from a molding surface that has minute surface features. As will be clear to one of ordinary skill in the art, the carrier layer 120 should be selected according to the properties of the elastomeric contact mask being molded in order to ensure preferential adhesion to the carrier layer 120.

As an alternative to using a release layer, one or both of the molding surfaces may be coated with a release coating. Nonadhesive coating materials include perfluoro silicones, perofluoro (ethylene oxide) or other non-adhesive material that do not inhibit curing of the polymer precursor. These coatings may be applied by brushing or spraying onto the mold surface.

Additionally, rigid first and second plates 170 and 180, formed from materials such as aluminum, steel, nickel, glass, or the like, can be used to apply pressure to the first and second half molds 110 and 130 respectively. Pressure is applied by placing the first and second plates on the bearing surface of the first and second half mold 110 and 130 respectively and applying pressure to the outside of first and second plates 170 and 180 such that the plates are pushed together. Pressure may be applied by pneumatic, hydraulic, mechanical or electromechanical means. Pressures applied may range from $0.1\ \text{N/cm}^2$ to $100\ \text{N/cm}^2$. Applying pressure to the plates thus transmits pressure to the half molds.

The present invention also provides methods of using the complementary mold. FIG. 1 shows an embodiment of how to use complementary mold 100. First half mold 110 is provided and a release layer 120 is disposed adjacent to the first half mold 110 along its molding surface. Release layer 120 may also act as a carrier layer, depending on the polymer contact mask being molded. A second half mold 130 is provided, which has surface structures on a portion of its molding surface 132. A void is formed between the molding surfaces of the first and second half molds 110 and 130 when they are closed. One of the half molds may optionally have a channel 150 for drainage of excess molding precursor and a sealing structure 160 along or near the edge of its molding surface.

A molding precursor may be introduced either before or after closing the mold 100. If the molding precursor is introduced into the void before closing the mold 100, excess precursor will be squeezed out when pressure is applied through channel 150 if provided. If the molding precursor is introduced into the void after closing the mold, then the precursor can be injected into the complementary mold 100, or it can be allowed to fill the void via capillary forces.

Figure 2:
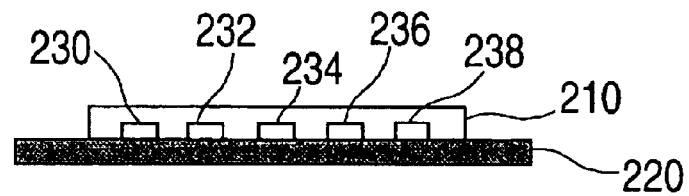
FIG. 2 illustrates a process of the invention in which voids are formed using a PDMS contact mask and a substrate.

FIG. 2 shows another embodiment of the mold in which an elastomeric half mold 210 (e.g. PDMS) is used with a rigid half mold 220 (e.g., polyethylene or glass). A plurality of mold cavities 230–238 are formed as a result of abutting the contact surfaces of the elastomeric half 210 and the rigid half 220. Mold cavities 230–238 may be hydraulically separated from one another, e.g., fluid from mold cavity 230 can be prevented from leaking out of or into mold cavity 232.

First and second plates 170 and 180 respectively are used to apply pressure to the first half mold 110 and the second half mold 130. The pressure can range from approximately $0.1\ \text{N/cm}^2$ to $100\ \text{N/cm}^2$. In addition, while pressure is being applied the molding precursor is polymerized in a manner appropriate for the polymeric precursor. For example, the precursor may be polymerized using thermal, chemical, electrochemical, or photochemical methods.

The complementary molding process of the present invention may be conducted using lower pressure than typically is used in conventional injection molding and embossing techniques. For example, to accurately complementary mold structures that have features greater than 100 µm, no pressure needs to be applied if the curing temperature is not greater than approximately 60° C. depending on the contact mask material. The curing temperature in the case of a polymerization depends in part upon the choice of chemical initiator if one is used. Thus, if one desires to conduct a radical polymerization at less than 60° C. one of skill may select a chemical initiator with a half life of about 1 to about 6 hours within the desired temperature range. In addition, the use of a photolabile initiator and irradiation may be adopted.

After polymerizing of the molding precursor is complete, the first half mold 110 and the second half mold 130 are separated to release a new molded contact mask 140. Release layer 120 may be used to facilitate the separation process.

The complementary molding process of the present invention may be automated for mass production. The molding process of the invention may be carried out in a serial, batch, or continuous process. In a serial process, one contact mask is molded per process cycle. In a batch process, more than one contact mask may be molded concurrently, but only those contact masks are printed during that cycle.

In one such automated process, one or both of the half molds moves relative to a continuously supplied molding precursor. In another automated process, a carrier film can be used to continuously move the molding precursor through the complementary molding process and transport cured polymeric gel away from the mold. In another embodiment of the invention, the complementary half molds and the molding precursor may be moved in concert along a carrier film. Regardless of whether the complementary half molds or the carrier film is moved, the movement may be accomplished by a conveyer belt, reel to reel process, directly-driven moving fixtures or pallets, chain or belt driven fixtures or pallets, a moving cart, a frictional roller, or a rotary apparatus.

According to another automated embodiment of the present invention, the half molds are automatically oriented in a desired or preset configuration relative to each other. The alignment may be accomplished with the use of a sensor or sensors. By way of non-limiting example, these sensors may include charge-coupled devices (for example, a camera), or capacitative, inductive, and displacement sensors. The alignment may also be accomplished with fine positioning actuators. Such positioning actuators may include, for example, micrometer stages, flexural stages, air-bearing stages, magnetic bearing stages, and laser-guided optical alignment.

Figure 4:
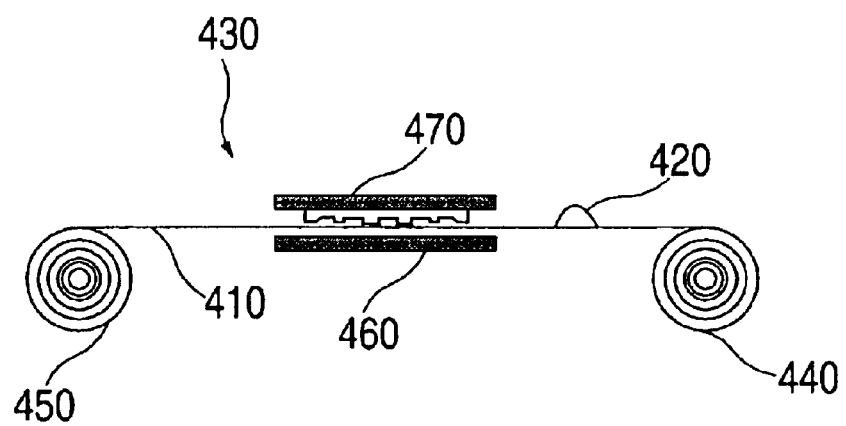
FIG. 4 illustrates a continuous molding process in accordance with the principles of the present invention.

FIG. 4 schematically represents a continuous reel-to-reel complementary molding process, where the carrier film 410 upon which the molding precursor 420 is placed. The complementary mold 430 can be used in the same manner as described above except that the process is repeated as the carrier film 410 moves from the unprocessed reel 440 to the processed reel 450. A first half mold 460 and a second half mold 470, comprising the complementary mold 430, are brought into contact to form a void. The molding precursor 420 fills the void between the first half mold 460 and the second half mold 470. As the carrier film 410 moves, the complementary mold 430 moves as well. Pressure is applied to the complementary mold 430 and polymerization or solvent evaporation in the molding precursor 420 takes place as the complementary mold 430 moves toward the processed reel 450. Before the complementary mold 430 reaches the processed reel, the complementary mold 430 is separated and the cured contact mask (not shown) is separated from the complementary mold 430. The contact mask may then be removed from the carrier film or processed as appropriate for the desired application.

Alternatively, the complementary molding technique may be used with non-film substrates. For example, a polymer gel membrane may be formed on a pre-cut substrate, which is moved along a conveyor belt.

The invention will now be further illustrated with the following non-limiting examples.

EXAMPLES

Example 1

Molding Using a Mold Having a PDMS Half Mold and a Polyethylene Half Mold

PolyHEMA (0.5 ml) precursor containing 97 wt. % of 2-hydroxyethyl-methacrylate ("HEMA"), 2 wt. % of methacrylic acid, 0.5 wt. % of ethyleneglycol dimethacrylate and 0.5 wt. % of a peroxide free radical initiator, Perkadox® (Kayaku Noury Co.), was introduced into the void between a PDMS half mold and a polyethylene half mold. The PDMS half mold was flat without any surface structures. The polyethylene half mold had an ordered array of 100 μm diameter circular posts, 100 μm in height. The mold was placed between two glass plates and approximately 5–10 N/cm$^2$ pressure was applied to the bearing surfaces. The mixture was polymerized by placing the mold in an oven at approximately 85° C. for 4 hours. The PDMS and polyethylene halves were then separated, and the resulting polyHEMA patterned hydrogel contact mask was removed from the mold.

Example 2

Molding Using a Mold Having a PDMS Half Mold and Polytetrafluoroethylene Half Mold The molding surface of the PDMS half mold provided surface structures, while the molding surface of the polytetrafluoroethylene half was flat. The patterns on the PDMS half included posts approximately 100 μm in diameter and approximately 50 μm height. The contact mask formed using this complementary mold was made from a polymeric precursor comprising 10% of a mixture of polyethyleneglycol dimethacrylate oligomers:

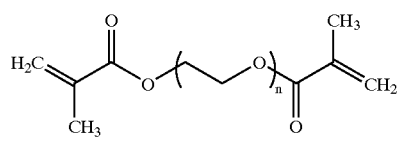

(where n=9–12), 90% HEMA and 0.1% by weight of the initiator Perkadox®. The polymeric precursor (0.1 ml) was placed on the PDMS master and excess polymeric precursor was allowed to run off as the PDMS and polytetrafluoroethylene half molds were brought together between two glass plates. Approximately 10 N/cm$^2$ of pressure was applied and the complementary mold was placed in an oven at approximately 85° C. for 4 hours. The complementary mold was then cooled to room temperature and the polytetrafluoroethylene half mold was removed. The molded contact mask adhered to the PDMS master, but was removed from the PDMS half mold using transparent tape. The transparent tape peeled off easily after the hydrogel contact mask was hydrated.

Example 3

Use of a Hydrogel Contact Mask to Pattern Biological Materials

A contact mask as made in Example 1 or 2 was fully hydrated in deionized water for 2 hours at room temperature. The contact mask thus became highly flexible and pliable.

The hydrated contact mask was placed on a 5 cm diameter culture dish. The size of the contact mask was approximately 10 mm×20 mm. The contact mask contained cavities, having 100 μm diameters. After allowing the mask to adhere to the culture dish, the assembly was tilted to drain off excess water and placed in an oven at 37° C. for 20 to 40 min to partially dehydrate the hydrogel.

When partially dehydrated, the hydrogel contact mask adhered strongly to the culture dish. 5 ml of Dulbecco's Modified Eagle Medium (DMEM) and 10% Calf Serum was added to the membrane and a gentle vacuum was applied to extract air bubbles. The medium was then allowed to hydrate the contact mask.

Freshly trypsinized 3T3 cells (1 ml, 15 cells) were added to the culture dish. The cells were allowed to settle to bottom of the cavities. After 30 min. the unadhered cells were washed off using DMEM/CS medium. Under 5 ml of fresh DMEM/CS medium, the 3T3 cells were allowed to grow. After 24 hours, the hydrogel contact mask maintained a good seal and contact with the substrate. Minimal adhesion of 3T3 cells to the hydrogel contact mask was observed.

Example 4

Molding with a Mold Having Two Elastomeric Half Molds with Patterned Mold Surfaces Both the first and second elastomeric halves were PDMS and both the first and second elastomeric halves had surface structures on portions of their molding surfaces. The first and second halves were used in the same complementary mold method as described above, except that in this case both halves forming the sealed enclosure were elastomeric.

The first PDMS half was patterned with posts 5 μm in diameter and 10 μm in height, and the second PDMS half was patterned with posts 100 μm in diameter and 100 μm in height. The polymer formed from this complementary mold was polyurethane. A polyurethane precursor NOA65 (Norland Products) was introduced between the two PDMS half molds, which were placed between two glass plates. Approximately 0.5 N/cm$^2$ of pressure was applied and the mold was exposed to UV light to polymerize the polyurethane precursor. The two PDMS halves were separated, and the resulting polyurethane contact mask having patterns on both its top and bottom surfaces was removed.

The disclosed embodiments are illustrative of the various ways in which the present invention may be practiced. Other embodiments can be implemented by those skilled in the art without departing from the spirit and scope of the present invention.

What is claimed is:

1. A patterning transfer element comprising a polymer gel, where the polymer gel comprises a crosslinked HEMA copolymer; and where the patterning transfer element has surface features that are elevated portions or recessed portions so as to allow for the patterning of biological materials by the patterning transfer element.

2. The patterning transfer element of claim 1 wherein the patterning transfer element is a stamp.

3. The patterning transfer element of claim 1 wherein the patterning transfer element is applied to an inanimate substrate.

4. The patterning transfer element of claim 1 wherein the patterning transfer element conforms to a surface of a substrate upon contact with the surface.

5. A contact mask comprising a polymer gel and having holes or cavities with a cross-sectional area of from approximately 1 μm$^2$ to approximately 2 mm$^2$.

6. The contact mask of claim 5 wherein the polymer gel is a hydrogel.

7. The contact mask of claim 6 wherein the hydrogel comprises polymer chains of polyHEMA.

8. The contact mask of claim 7 wherein the polymer chains are a homopolymer of HEMA crosslinked with a crosslinking agent.

9. The contact mask of claim 8 wherein the crosslinking agent is a diacrylate or polyacrylate.

10. The contact mask of claim 7 wherein the polymer chains are co-polymers of HEMA, a hydrophobic monomer and, optionally, a crosslinking agent.

11. The contact mask of claim 7 wherein the polymer chains are block co-polymers of HEMA and a biodegradable polymer.

12. The contact mask of claim 6 wherein the hydrogel is formed by polymerization of a polymer precursor composition comprising one or more chemically distinct monomer compounds and a crosslinking agent wherein the crosslinking agent is present in an amount of about 1 mole percent to about 5 mole percent with respect to the total monomer compound content.

13. The contact mask of claim 5 wherein the contact mask ranges from approximately 5 μm to approximately 3 mm in thickness.

14. The contact mask of claim 5 wherein the polymer gel is selected from the group consisting of polyphosphazenes; polyacrylates; polymethacrylates, poly(ethylene glycol), poly(ethylene glycol) acrylates, poly(vinyl alcohol), polyethylene glycol methacrylates, 2-trimethoxysilyloxy)ethyl methacrylate, trimethoxysilyloxy alkyl methacrylate, trimethoxy silyl alkyl methacrylate, polyvinylpyrrolidinone and carbohydrate-based hydrogel polymers, heparin, heparin sulfate, hyaluronic acid, polylactic acid, polybutadienes, hydrogels, and combinations thereof.

15. The contact mask of claim 5 formed by complementary molding.

16. The contact mask of claim 5 wherein the polymer gel is a hydrogel or polyelectrolyte gel.

17. The contact mask of claim 5 wherein the mask is located on an inanimate substrate.

18. The contact mask of claim 5 wherein the mask is in conformal contact with a surface upon which the mask is located to provide a seal between the mask and the surface.

19. The contact mask of claim 18 wherein the surface is the surface of a culture dish for culturing cells.

20. A hydrogel contact mask where the hydrogel comprises polymer chains of polyHEMA and the polymer chains are co-polymers of HEMA, a hydrophobic monomer and, optionally, a crosslinking agent and where the contact mask has surface features that are elevated portions or recessed portions so as to allow for the patterning of biological materials by the contact mask.

21. A hydrogel contact mask wherein the hydrogel comprises polymer chains of polyHEMA and the polymer chains are block co-polymers of HEMA and a biodegradable polymer and where the contact mask has surface features that are elevated portions or recessed portions so as to allow for the patterning of biological materials by the contact mask.

22. A patterning transfer element comprising a polymer gel where the polymer gel comprises a HEMA copolymer and where the patterning transfer element has surface features that are elevated portions or recessed portions so as to allow for the patterning of biological materials by the patterning transfer element.

23. A contact mask comprising a polymer gel wherein the polymer gel comprises a HEMA copolymer and where the contact mask has surface features that are elevated portions or recessed portions so as to allow for the patterning of biological materials by the contact mask.

24. The contact mask of claim 23 comprising at least one hole therethrough.

25. A contact mask comprising a polymer gel with a surface having a pattern of cavities complementary to an ordered array of posts in a half mold used to produce the contact mask.

26. The contact mask of claim 25 wherein there are cells in the cavities.

27. The contact mask of claim 26 wherein cells are not adhering to the surface of the contact mask.

28. A contact mask having a top and a bottom surface comprising a pattern of cavities in both the top and bottom surfaces where the cavities in the top surface are complementary to an ordered array of posts in a first half mold used to produce the contact mask and where the cavities in the bottom surface are complementary to an ordered array of posts in a second half mold used to produce the contact mask.

* * * * *

UNITED STATES PATENT AND TRADEMARK OFFICE
CERTIFICATE OF CORRECTION

PATENT NO. : 6,770,721 B1
DATED : August 3, 2004
INVENTOR(S) : Enoch Kim

It is certified that error appears in the above-identified patent and that said Letters Patent is hereby corrected as shown below:

Column 5,
Line 27, change "polymers hydrogels" to -- polymer hydrogels, --

Column 6,
Line 55, change "multifinctional" to -- multifunctional --

Signed and Sealed this

Tenth Day of May, 2005

JON W. DUDAS
*Director of the United States Patent and Trademark Office*